United States Patent Office 3,335,153
Patented Aug. 8, 1967

---

3,335,153
3,4,5,6-TETRAHYDROTHIOPHTHALIDE
Robert W. Campbell, Orinda, Calif., assignor to Chevron Research Company, a corporation of Delaware
No Drawing. Filed Oct. 20, 1964, Ser. No. 405,238
2 Claims. (Cl. 260—332.3)

This invention relates to the novel composition, 3,4,5,6-tetrahydrothiophthalide (THTP).

The subject compound is a reactive chemical intermediate useful for the preparation in particular of dyes and chlorinated organic sulfur containing insecticides. Under mild oxidative coupling conditions two molecules of the subject compound dimerizes yielding the chromophoric compound:

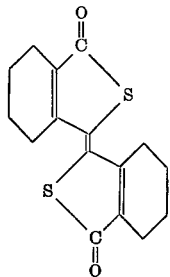

The novel compound may be prepared by the reduction of cyclohexane-1,2-dicarboxylic anhydride using hydrogen and hydrogen sulfide under pressure in a steel-lined autoclave.

Example 1

To a steel-lined 2.5 liter autoclave was charged cyclohexane-1,2-dicarboxylic anhydride (385 g., 2.50 moles), hydrogen sulfide (170 g., 5.0 moles), and hydrogen (to 900 p.s.i.g.). The shaken autoclave was then heated to about 260° C. and maintained at this temperature for 2 hours. The product was a mixture of a deep red oil and a white solid. The recovered solid was found to be about 1.16 mole of cyclohexane-1,2-dicarboxylic acid. The red oil was dissolved in benzene, extracted with 5% aqueous sodium bicarbonate and then evaporated and cooled to 0% C. The oil partially crystallized. A sticky yellow solid was collected. A carbon decolorization and two subsequent recrystallizations from methanol yielded a white crystalline product, M.P. 42–43° C.; $\lambda_{max}$ in 95% ethanol: 233 m$\mu$ (log (−4.02), 258 inflection (3.43); $V_{c=o}$ 1690, $V_{c=c}$ 1655 cm.$^{-1}$ in carbon tetrachloride. The nuclear magnetic resonance spectrum (Varian A–60 spectrometer) showed following absorptions (in tau-values, tetramethylsilane external standard): 8.25, quartet, unconjugated methylene; 7.70, diffuse multiplet, vinyl methylene; 6.17, singlet, split slightly, vinyl methylene adjacent to sulfur; calculated area ratio 2:2:1; observed 2.1:2.1:1.

*Analysis.*—Calculated for $C_8H_{10}OS$ (154.31); C, 62.26; H, 6.53; S, 20.68. Found: C, 61.98; H, 6.48; S, 20.52. The molecular weight (mass spectra) was found to be 154.

Example 2

12 g. of THTP were dissolved in 250 ml. of chloroform and the mixture cooled and maintained at about 0° C. Chlorine gas was passed over the solution surface until an estimated 2 moles of chlorine per mol of THTP had reacted. Hydrogen chloride was evolved as a by-product. The structure of the resulting product was shown by Nuclear Magnetic Resonance spectra to correspond to 7,7-dichloro-3,4,5,6-tetrahydrothiophthalide. There was a multiplet at 1.9 (tau-values), 2.5 and 2.9 p.p.m. in a ratio of 2:1:1. The compound is a reactive polyfunctional chemical intermediate as well as having insecticidal characteristics.

I claim:
1. 3,4,5,6-tetrahydrothiophthalide.
2. 7,7-dichloro-3,4,5,6-tetrahydrothiophthalide.

References Cited
UNITED STATES PATENTS
3,061,612  10/1962  Toland _____ 260—330.5

WALTER A. MODANCE, *Primary Examiner.*
JOHN D. RANDOLPH, *Examiner.*
C. SHURKO, *Assistant Examiner.*